United States Patent
Curran (10) Patent No.: US 7,853,924 B2
(45) Date of Patent: Dec. 14, 2010

(54) SYSTEMS AND METHODS FOR PROCESSING NON-FUNCTIONAL COMMENTARY OF COMPUTER SOURCE CODE

(75) Inventor: Kevin Michael Curran, Morris Plains, NJ (US)

(73) Assignee: SAP AG, Walldorf (DE)

( * ) Notice: Subject to any disclaimer, the term of this patent is extended or adjusted under 35 U.S.C. 154(b) by 1280 days.

(21) Appl. No.: 11/404,331

(22) Filed: Apr. 13, 2006

(65) Prior Publication Data

US 2007/0245304 A1   Oct. 18, 2007

(51) Int. Cl.
*G06F 9/44* (2006.01)
(52) U.S. Cl. .................... 717/110; 715/724; 715/770
(58) Field of Classification Search .............. 717/110; 715/724, 770
See application file for complete search history.

(56) References Cited

U.S. PATENT DOCUMENTS

| | | | |
|---|---|---|---|
| 4,860,203 A | 8/1989 | Corrigan et al. | |
| 4,931,928 A | 6/1990 | Greenfeld | |
| 5,513,305 A | 4/1996 | Maghbouleh | |
| 5,862,382 A | 1/1999 | Kataoka | |
| 6,226,665 B1 * | 5/2001 | Deo et al. | 718/106 |
| 6,367,068 B1 | 4/2002 | Vaidyanathan et al. | |
| 6,574,792 B1 | 6/2003 | Easton | |
| 6,961,931 B2 | 11/2005 | Fischer | |
| 7,149,680 B2 * | 12/2006 | Storisteanu et al. | 704/1 |
| 7,237,224 B1 * | 6/2007 | Motoyama et al. | 717/106 |
| 7,454,744 B2 * | 11/2008 | Bhogal et al. | 717/122 |
| 2003/0233621 A1 | 12/2003 | Paolini et al. | |
| 2004/0003383 A1 * | 1/2004 | Chenier | 717/154 |
| 2005/0060692 A1 * | 3/2005 | Mansourov | 717/141 |
| 2005/0229156 A1 | 10/2005 | Baumann | |
| 2006/0089728 A1 * | 4/2006 | Maeda et al. | 700/18 |

* cited by examiner

*Primary Examiner*—Wei Y Zhen
*Assistant Examiner*—Phillip H Nguyen
(74) *Attorney, Agent, or Firm*—Finnegan, Henderson, Farabow, Garrett & Dunner, L.L.P.

(57) ABSTRACT

Systems and methods are disclosed for editing pre-existing source code to remove non-functional commentary. In one exemplary embodiment, there is provided a method for processing the pre-existing source code and providing a cleansed version of source code. Moreover, the method includes identifying the non-functional commentary in the pre-existing code; cutting the non-functional commentary from the pre-existing code; and providing an edited version of code absent the non-functional commentary. Other exemplary embodiments may include generating reference information that associates the non-functional commentary with the locations in the pre-existing code from where the non-functional commentary was deleted.

17 Claims, 8 Drawing Sheets

SYSTEMS AND METHODS FOR PROCESSING NON-FUNCTIONAL COMMENTARY OF COMPUTER SOURCE CODE

BACKGROUND

1. Field of the Invention

The present invention relates to processing computer code, and, more particularly, to processing non-functional commentary of computer source code.

2. Description of Related Information

Computer source code typically includes non-functional commentary, such as comments describing particular portions of the code or comments providing information about the version or function of the code. Existing systems for processing source code sometimes include components that identify or display the non-functional commentary. However, such components generally facilitate only access to or presentation of the commentary. They are unable to remove the commentary or otherwise make it inaccessible to users that a programmer does not intend to view the commentary.

Other existing systems may include components that store non-functional commentary in a separate file or location as the code is created. Such systems may then allow a user to selectively associate the stored commentary with the source code. In this way, these existing systems may make the non-functional commentary initially inaccessible to end users of the source code, but allow subsequent access to the commentary by, for example, limiting access to only authorized users. A drawback of these systems, however, is that they only enable separation of commentary during the creation of source code, and are thus incapable of cleansing pre-existing code.

Furthermore, many existing systems are directed only to situations where the source code is not revealed to the end users. These systems fail to address concerns where the source is revealed to end user, such as by preventing end users from viewing non-functional commentary that a programmer does not intend for those users to view.

In sum, there is a need for systems that may adequately process pre-existing source code by, for example, automatically identifying and cleansing non-functional commentary from the source code.

SUMMARY

Systems, methods, and articles of manufacture consistent with the invention are directed to editing pre-existing source code having non-functional commentary to provide a cleansed version of the source code.

In one exemplary embodiment, there is provided a method for editing pre-existing code comprised of functional code and non-functional commentary. Moreover, the method includes identifying the non-functional commentary in the pre-existing code; cutting the non-functional commentary from the pre-existing code; and providing an edited version of code absent the non-functional commentary. One or more further embodiments can include generating reference information that associates the cut non-functional commentary with the locations in the pre-existing code from where the commentary was cut, as well as other editing functionality for manipulating the commentary.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Many systems and environments are used by computer programmers to author computer programs or otherwise develop and edit code. Examples of such system and environments are editors, compilers, program documentations systems, program verifiers, as well as type, static, or program checkers. These systems and environments can be implemented with a variety of components, including graphical interfaces and editors having specialized components for developing and/or editing code.

Figure 1:
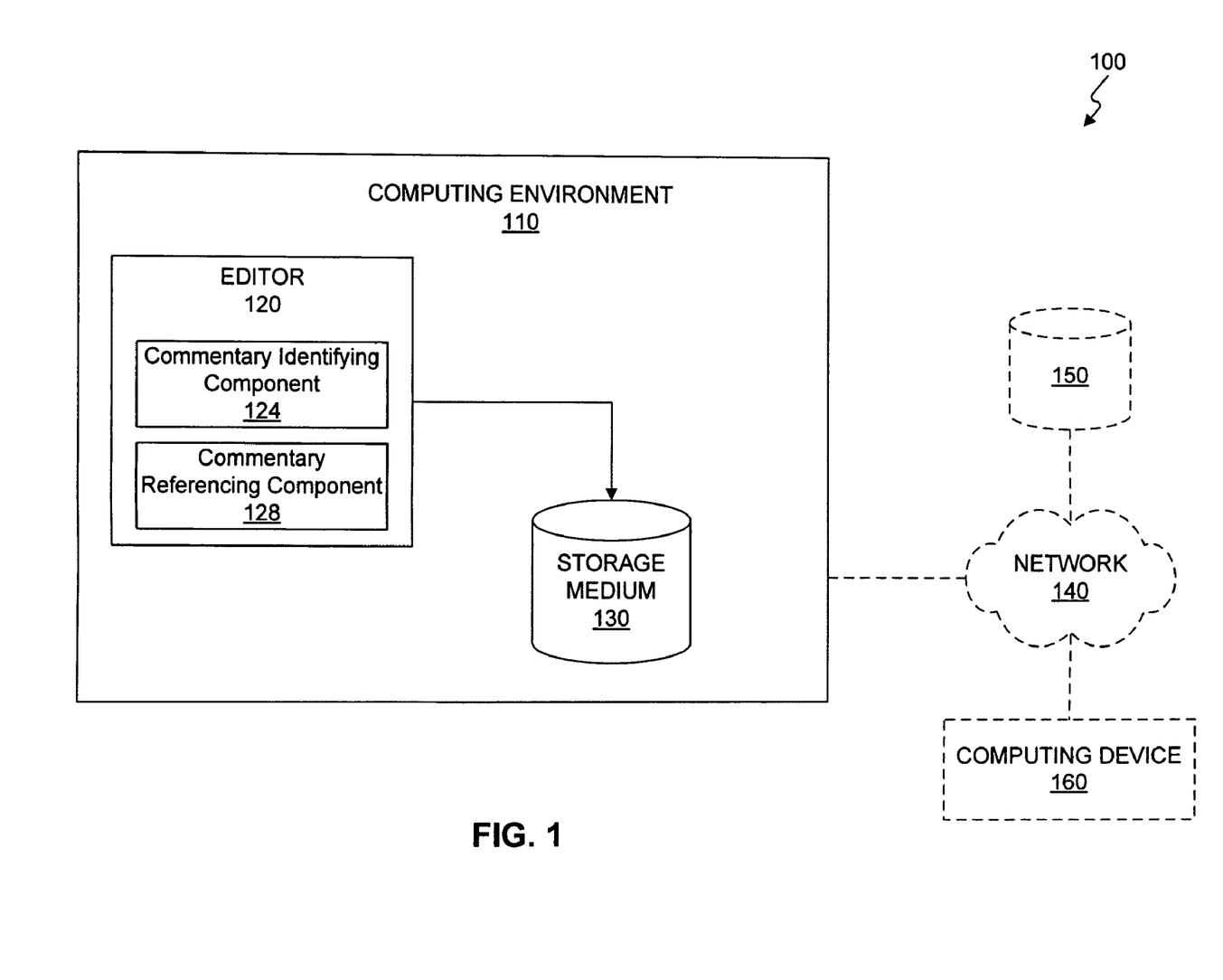
FIG. 1 is a block diagram of an exemplary system consistent with certain aspects related to the present invention.

FIG. 1 illustrates a block diagram of an exemplary system 100 consistent with certain aspects related to the present invention. Referring to FIG. 1, system 100 may comprise a computing environment 110 that may further include a source code editor 120 and a storage media 130. According to some embodiments, computing environment 110 may be connected by a network 140 to one or more external databases 150 and one or more computing devices 160. Persons of ordinary skill in the art will appreciate that system 100 is exemplary. For instance, while FIG. 1 shows only one computing environment 110, systems consistent with the invention may include any number of environments 110 connected, for example, via network 140.

In one exemplary embodiment, source code editor 120 may analyze pre-existing source code to identify non-functional commentary and provide a cleansed version of the code that does not include the commentary. As used herein, the term "pre-existing source code" refers to source code or related executable software or programming, whether compiled or not, that may have functional components and non-functional commentary components. As shown in FIG. 1, source code editor 120 may further include a commentary identifying component 124 and a commentary referencing component 128.

Commentary identifying component 124 of editor 120 may identify the non-functional commentary in the pre-existing source code. Editor 120 may then cut the identified commentary from the pre-existing code and provide a cleansed version of source code not having the commentary. In some cases, editor 120 may also paste the commentary into a separate commentary object. As used herein, "commentary object" refers to any object, file, string, or location wherein the non-functional commentary itself and/or data associated with the commentary may be located or stored. Editor 120 may also perform further steps related to use of this commentary object, as set forth in more detail below. In these further embodiments, the commentary object may be located in storage media 130, or it may be transmitted over a network and stored externally, such as in external database 150.

Commentary referencing component 128 may generate reference information that associates the removed or "cut" non-functional commentary with the locations in the pre-existing code from which the commentary was removed. This feature may be advantageous in embodiments where the cut commentary is stored in a commentary object (e.g., in storage media 130 or external database 150) to allow subsequent access by appropriate users of the cleansed code.

In some embodiments, system 100 may deliver the stored commentary over network 140 to a computing device 160 that transmits an authorized request for that commentary. An authorized request may, for example, be made by a user of the cleansed code who has authorization to view the commentary. In environments consistent with such embodiments, referencing component 128 may generate identifiers, such as links, in the cleansed source code to associate particular commentary with its original location in the source code. System 100 may also use these identifiers to deliver the appropriate commentary to a remote location in response to an authorized request transmitted, for example, from an external computing device 160 over network 140.

Storage media 130 and external database 150 may store data used or developed by editor 120. For example, media 130 and database 150 may store the original pre-existing source code, intermediate and cleansed versions of the source code, or commentary objects containing the cut commentary. Media 130 and database 150 may be any type of storage medium or device such as a disk drive, an optical drive, FLASH memory or the like, and may include any type of physical memory including RAM, DRAM, FLASH memory, or the like. Moreover, media 130 and database 150 may each include one or more storage elements, either maintained by a single computing device, such as device 160, or distributed across multiple computing devices.

Network 140 may be used to interconnect computing environment 110, database 150, and/or computing device 160. Network 140 may include, alone or in any suitable combination, a telephony-based network, a local area network (LAN), a wide area network (WAN), a dedicated intranet, a wireless LAN, the Internet, a wireless network, a bus, or any other any communication mechanisms. Network 140 may be implemented using any suitable combination of wired and/or wireless components and systems, and may be embodied using bi-directional or unidirectional communication links. Further, network 140 may utilize any type of protocol, such as Transmission Control Protocol/Internet Protocol (TCP/IP), Hyper Text Transfer Protocol (HTTP), SOAP (Simple Object Access Protocol), and Remote Procedure Call (RPC).

Computer 160 may be used by user to, for example, invoke the processes of computing environment 110. For instance, a user to may transmit a request via computer 160 to view commentary stored in a commentary object. Computing device 160 may include, among other things, a processor (not shown) for executing instructions and one or more memory devices (not shown) for storing computer program instructions and data. Device 160 may receive data from and/or transfer data to one or more mass storage devices (not shown) for storing data, such as either magnetic, optical, or magneto-optical storage devices. Furthermore, device 160 may be capable of interfacing to a network, such as network 140.

Figure 2:
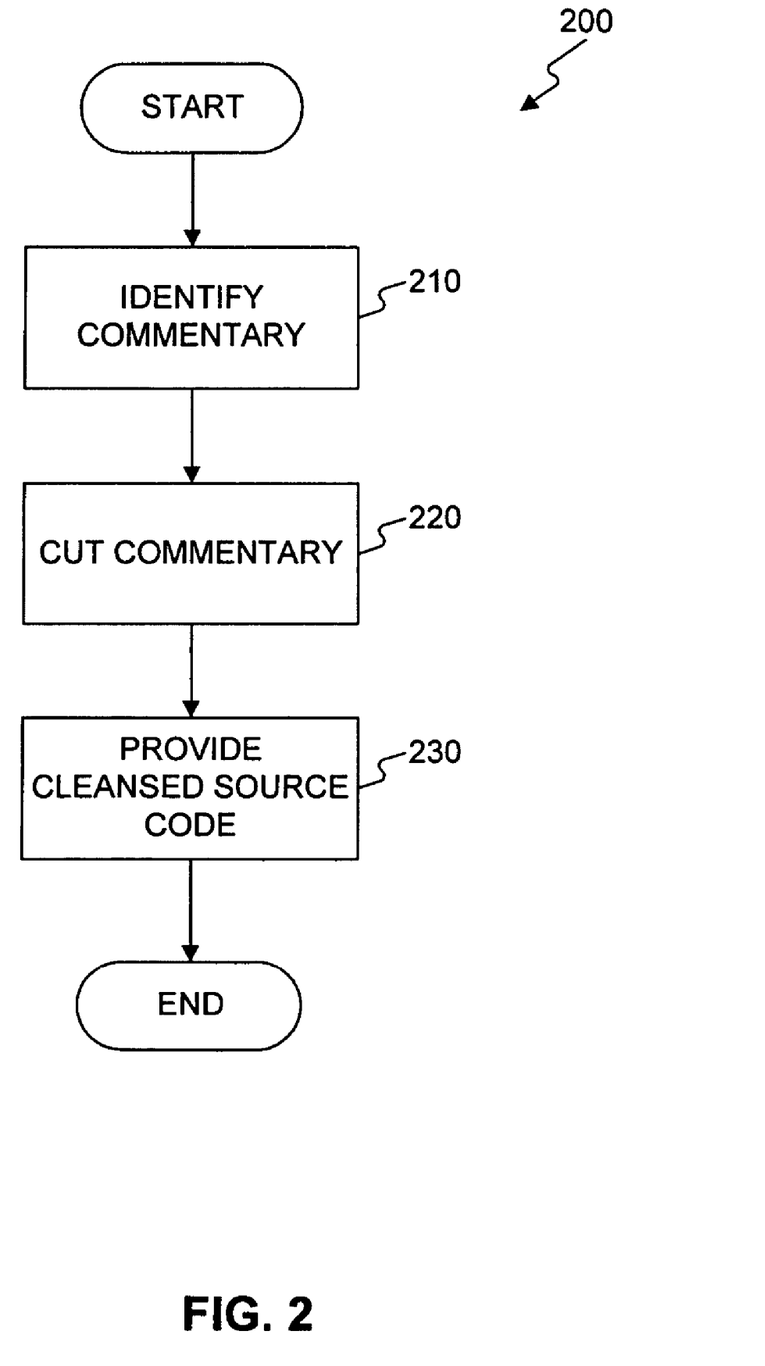
FIG. 2 is a flow chart illustrating an exemplary method of cleansing source code consistent with certain aspects related to the present invention.

FIG. 2 illustrates an exemplary flow chart with steps 200 consistent with certain aspects related to the present invention. As shown in FIG. 2, commentary identifying component 124 of editor 120 may identify the non-functional commentary in the pre-existing source code (step 210). For instance, component 124 may automatically distinguish portions or sequences of source code as being commentary. To this end, component 124 may search, filter, parse, and/or scan the original source code to analyze that code for syntactic, lexical and/or semantic information, such as keys, strings, symbols, tokens, text, grammar, annotations, or other operators, corresponding to non-functional commentary. The process for identifying non-functional commentary is described in further detail below with respect to FIG. 3.

After identifying the commentary, editor 120 may cut the identified non-functional commentary from the pre-existing source code (step 220). In one embodiment, this cutting operation may be implemented by using a variety of well known existing code editing programs. For instance, editor 120 may cut the identified commentary by using, for example, commercially available editing and compiling tools, such as ABAP Workbench and Eclipse (available from SAP AG, Walldorf, Germany, and IBM, respectively).

Editor 120 may provide or create a cleansed version of the source code absent the non-functional commentary (step 230). Editor 120 may provide, as an output, the cleansed version of source code, i.e., the pre-existing source code minus the non-functional commentary. The cleansed version of source code may be a clean version that, for example, is completely devoid of all non-functional commentary. Alternatively, the cleansed version may be a marked-up version that contains identifiers, such as links, keys or references to externally-stored commentary data, as set forth in more detail below. The cleansed version of the source code may then be further formatted, edited, and even compiled, by computing environment 110 as desired by a programmer or user.

With regard to the process for identifying the non-functional commentary, as described above in connection with step 210, such identification processes are well known to those skilled in the art. Examples of these identification processes include U.S. Pat. Nos. 4,860,203, 4,931,928, and 6,367,068, and U.S. Patent Application Publication No. US2003/0233621A1. For purposes of explanation, however, FIG. 3 illustrates an exemplary process for identifying non-functional commentary.

Figure 3:
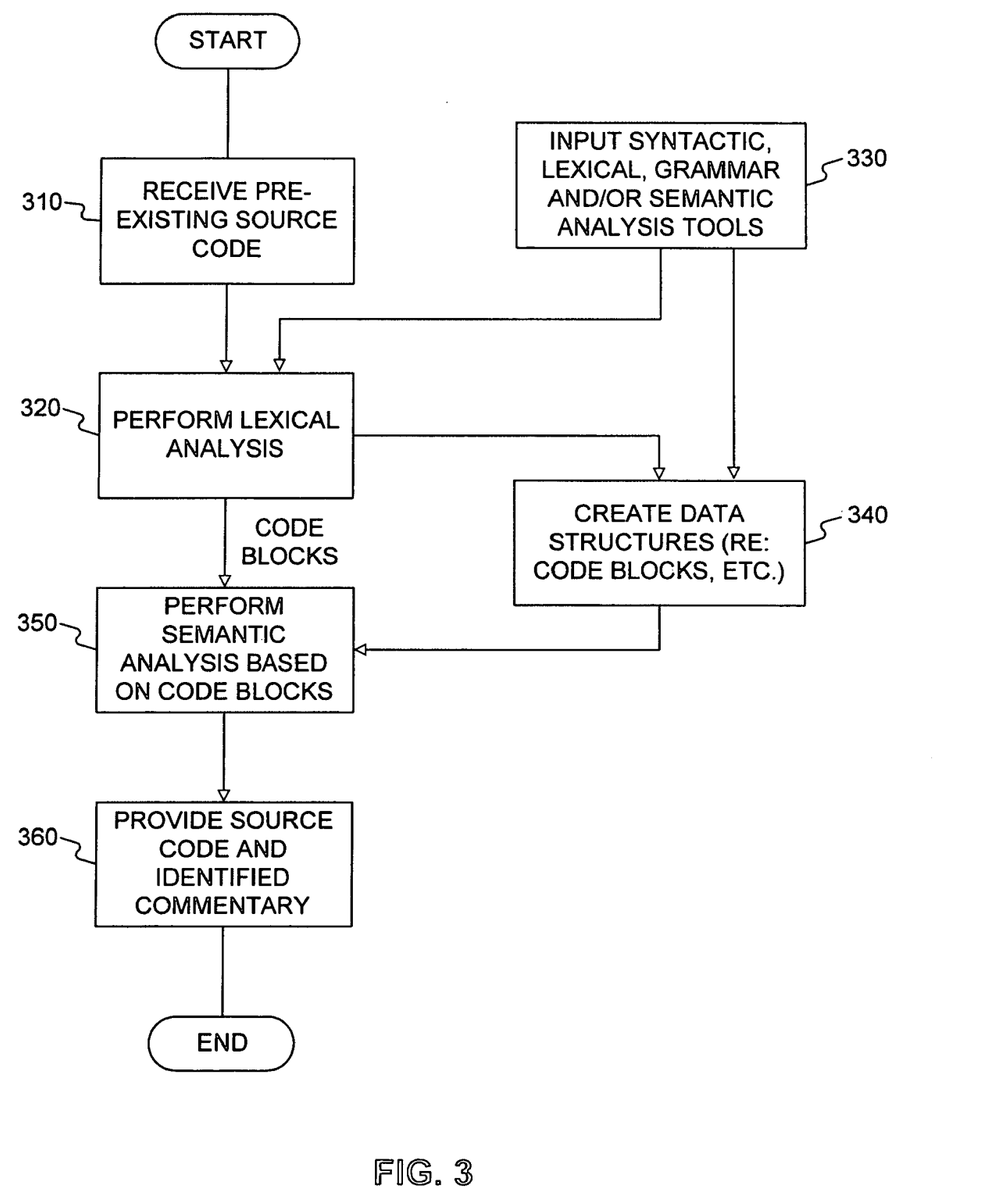
FIG. 3 is a flow chart illustrating exemplary commentary identifying functionality consistent with certain aspects related to the present invention.

As shown in FIG. 3, a commentary identifying component may receive the pre-existing source code (step 310) and use syntactic, lexical, and/or semantic analysis tools well known to those skilled in the art to separate the received code into blocks of code (step 320). Tokens or other annotations may be inserted to designate portions of code as containing or potentially containing commentary for identification. Further, this initial designation operation may include initially identifying those blocks of pre-existing source code that may require further processing to determine if the respective block of code does indeed correspond to or contain commentary. The blocks of code may be comprised of segments of language or code that correspond, for example, to lexical or syntactic categories used in subsequent processing. The commentary identifying component may use known semantic information, data tables, program templates, and grammar or formalities information to process the code (Step 330). In the process of separating blocks of code, the analysis tools may create data trees or structures for categorizing the blocks (step 340) that may, for example, be used to track the blocks for subsequent analysis.

The commentary identifying component may then parse the code blocks using additional analysis tools to identify the non-functional commentary (step 350). For instance, the component may analyze the code blocks in the context of the created data structures, as well as the other inputs, to provide data used to identify the non-functional commentary. The component may then provide the source code and identified commentary for additional processing (step 360).

Figure 4:
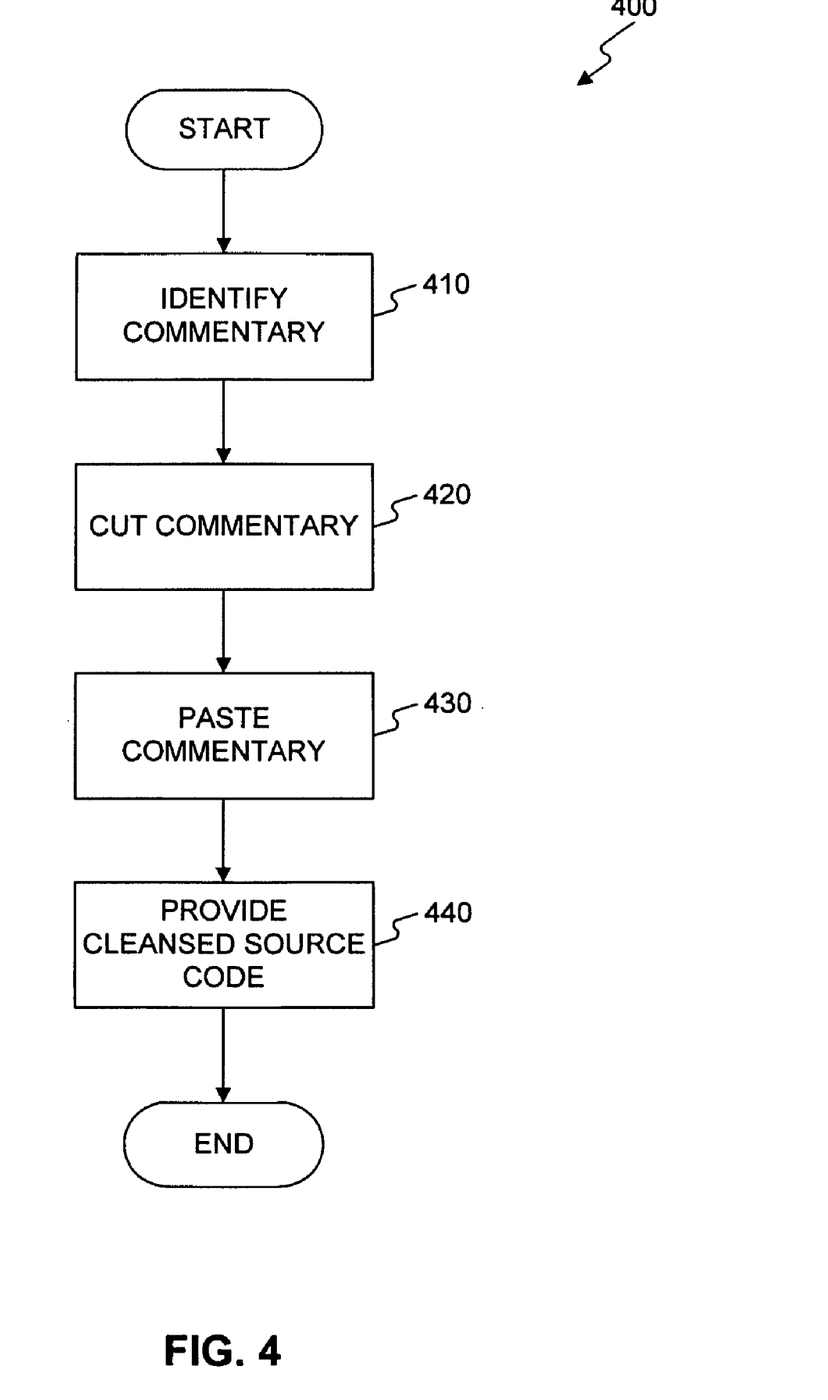
FIG. 4 is a flow chart illustrating another exemplary method of cleansing source code consistent with certain aspects related to the present invention.

FIG. 4 shows an exemplary flow chart 400 consistent with certain aspects related to the present invention. As with the embodiment of FIG. 2, editor 120 may identify the non-functional commentary in the pre-existing code (step 410) and cut the non-functional commentary from the pre-existing code (step 420). In the embodiment of FIG. 4, however, editor 120 may then paste the cut non-functional commentary to a commentary object (step 430). Further, as described above with respect to the embodiment of FIG. 2, editor 120 may provide a cleansed version of source code (step 440). The operation of steps 410, 420, and 440 are thus consistent with the like steps described above with respect to FIG. 2.

With regard to the pasting step 430, as noted above, editor 120 may paste the cut non-functional commentary into a commentary object. Editor 120 may implement this pasting operation by using a variety of well known code editing programs, such as the ABAP Workbench and Eclipse software mentioned above. Furthermore, editor 120 may paste the non-functional commentary into one or more extraction tables to facilitate later processing by system 100, such as processing that may include referencing or manipulating the commentary to provide easier access to the commentary and associated information. The extraction tables may store and organize information used to cut, copy, save, paste, and/or annotate the non-functional commentary. Information stored in the extraction tables may include: the commentary itself; its start and stop points in relation to the source code; date or time information concerning when the commentary was added or updated; other data regarding the state or condition of the commentary; identifiers or location data regarding the original location of the commentary; link information associated with the commentary; data descriptive of the role the commentary played; and/or other contextual data concerning the commentary. The extraction table information may be used during the steps of generating reference information for associating the non-functional commentary with the source code, providing a commentary object containing the non-functional commentary, providing cleansed code that is absent the non-functional commentary, as well as cutting, copying, pasting, and/or annotating the commentary itself.

System 100 may incorporate the extraction table information into the source code or commentary by use of identifiers, such as links or memory addresses, associated with either the table (or a location in the table) or a storage location of the data from the table. Additional aspects of exemplary extraction table functionality are set forth in connection with FIG. 8 below.

Figure 5:
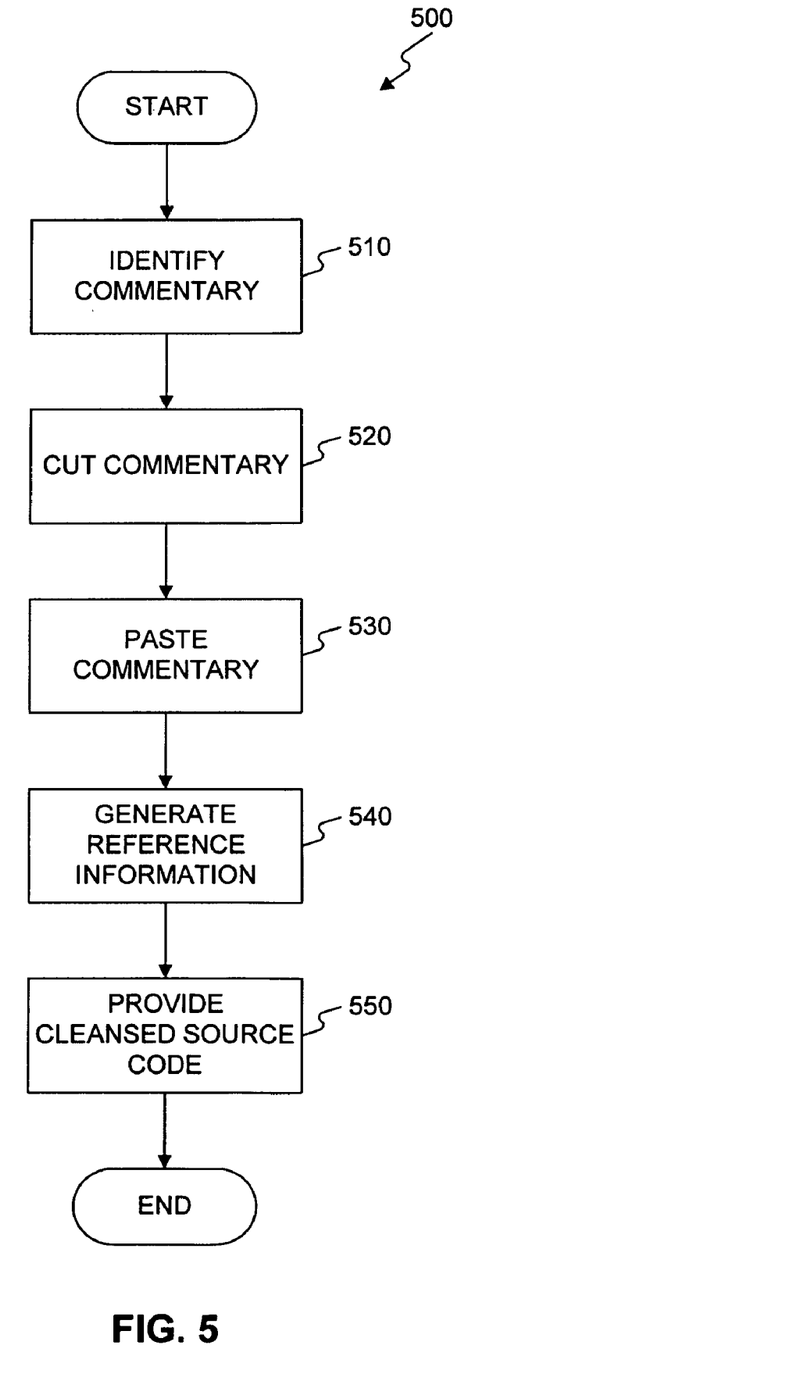
FIG. 5 is a flow chart illustrating yet another exemplary method of cleansing source code consistent with certain aspects related to the present invention.

FIG. 5 shows an exemplary method 500 consistent with certain aspects related to the present invention. As with the embodiment of FIGS. 2-3, editor 120 may identify the non-functional commentary in the pre-existing source code (step 510), cut the non-functional commentary from the pre-existing source code (step 520), paste the cut commentary into a commentary object (step 530), and provide a cleansed version of source code (step 550). The operation of steps 510, 520, 530, and 550 are thus consistent with the like steps described above with respect to FIGS. 2 and 3.

In the embodiment of FIG. 5, however, editor 120 may also generate reference information associated with the cut or pasted commentary (step 540). For example, commentary referencing component 128 of editor 120 may generate reference information that associates the non-functional commentary with the locations in the pre-existing source code from which the non-functional commentary was cut. This reference information may positively identify the initial location of the commentary from within the sequence of pre-existing source code, and may be used, for example, to reconstruct the original source code. To this end, component 128 may identify and record information regarding the position of the commentary within the source code when, for example, editor 120 cuts the commentary from the code. Component 128 may generate this reference information based on: (1) the lines of program code or sections/subsections in which the commentary originally appeared, (2) symbolic information, such as lexical positioning of identifiers or the commentary's physical or spatial (e.g., X-Y) location, (3) functional elements of the code or code blocks in the source code; and/or (4) links or identifiers embedded within the source code.

Component 128 may also generate reference information in connection with the extraction table features described above to provide faster and easier access to the commentary information. For example, this reference information may include a link or pointer to an extraction table location and/or may identify a location in the extraction table itself. A location in an extraction table may be identified by a field identifier (e.g., a particular row and column location). The physical storage locations for the extraction table may be any addressable location including, for example, a location within the commentary object or an external location.

System 100 may store this reference information in the extraction tables and/or may embed it within either the commentary object or the cleansed source code itself. Reference information embedded within the cleansed source code may include links or coded reference data that points to the location of the commentary or the commentary itself. The cleansed source code containing coded reference data corresponds to the "marked" version containing references to externally-stored commentary data, as discussed in connection with FIG. 2 above. Such referencing functionality is well know to those of ordinary skill. Examples of the above reference generating functionality include U.S. Pat. Nos. 5,513, 305, 5,752,058, and 6,574,792.

Figure 6:
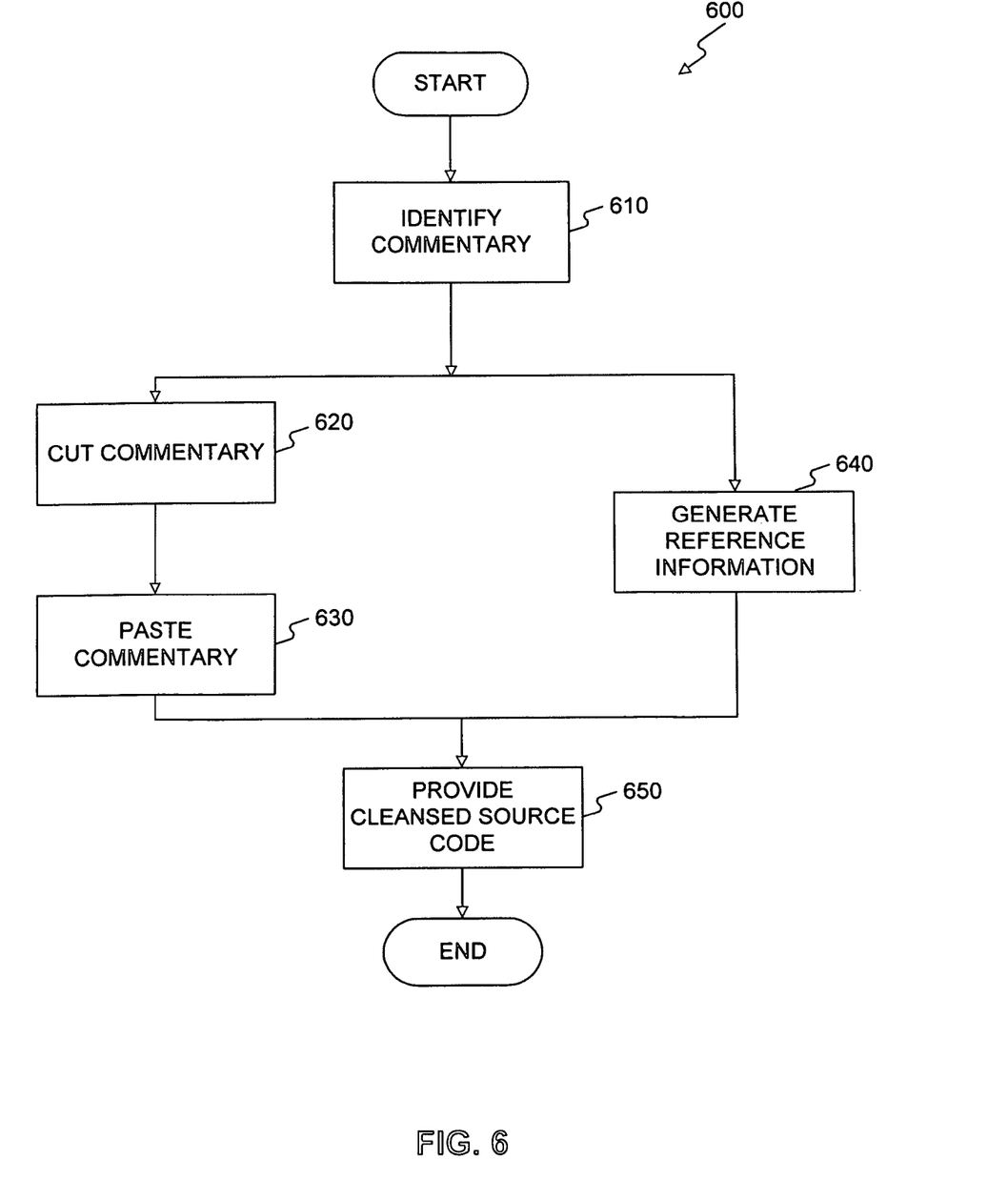
FIG. 6 is a flow chart illustrating still another exemplary method of cleansing source code consistent with certain aspects related to the present invention.

Referring back to FIG. 5, while it illustrates processing steps 510 to 550 in a certain order, persons of ordinary skill in the art will appreciate that these processing steps need not be performed in any certain order. For example, FIG. 6 illustrates an embodiment showing how these steps may be performed in a different order, such as, for example, in parallel. More specifically, the embodiment of FIG. 6 illustrates processing steps 610 to 650, which correspond to processing steps 510 to 550 discussed above with respect to FIG. 5. The embodiment of FIG. 6 differs from FIG. 5, however, only in that the generation of reference information (step 640) is illustrated as occurring in parallel with the cutting and pasting of the commentary (steps 520-530, 620-630). Other orders of the illustrated processing steps are, however, possible.

Figure 7:
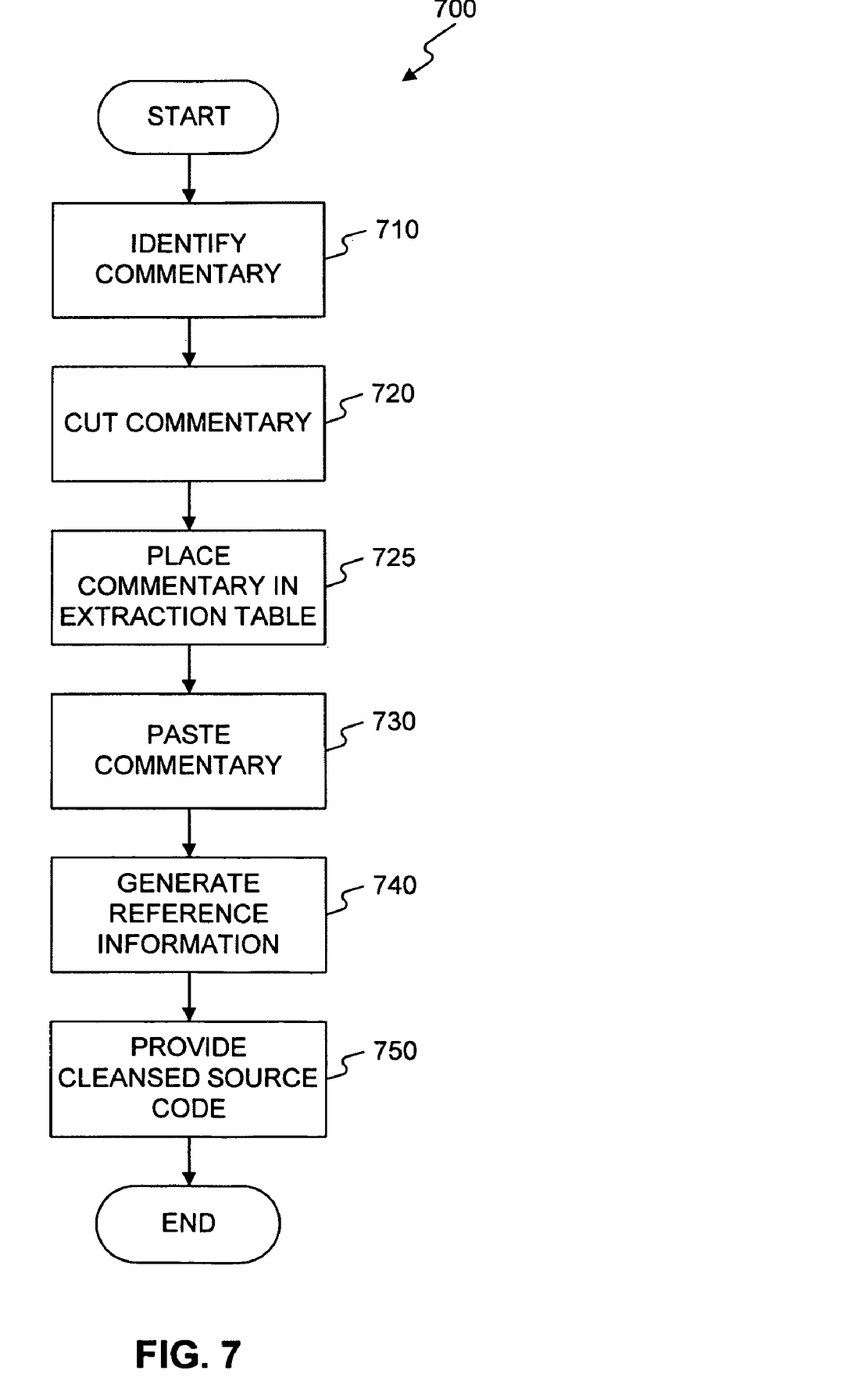
FIG. 7 is a flow chart illustrating a further exemplary method of cleansing source code consistent with certain aspects of the present invention.

FIG. 7 shows an exemplary method 700 consistent with certain aspects related to the present invention. As with the embodiment of FIG. 5, editor 120 may identify the non-functional commentary in the pre-existing source code (step 710), cut the non-functional commentary from the pre-existing source code (step 720), paste the cut commentary into a commentary object (step 730), generate reference information associated with the cut or pasted commentary (step 740), and provide a cleansed version of source code (step 750). The operation of steps 710 to 750 are, thus, consistent with the like steps described above with respect to FIGS. 2-6.

In the embodiment of FIG. 7, however, editor 120 may also place the identified or cut commentary into an extraction table (step 725). For example, editor 120 may create an extraction table and place cut commentary and associated data into data fields of the extraction table to allow this data to be more readily accessed by the system.

Figure 8:
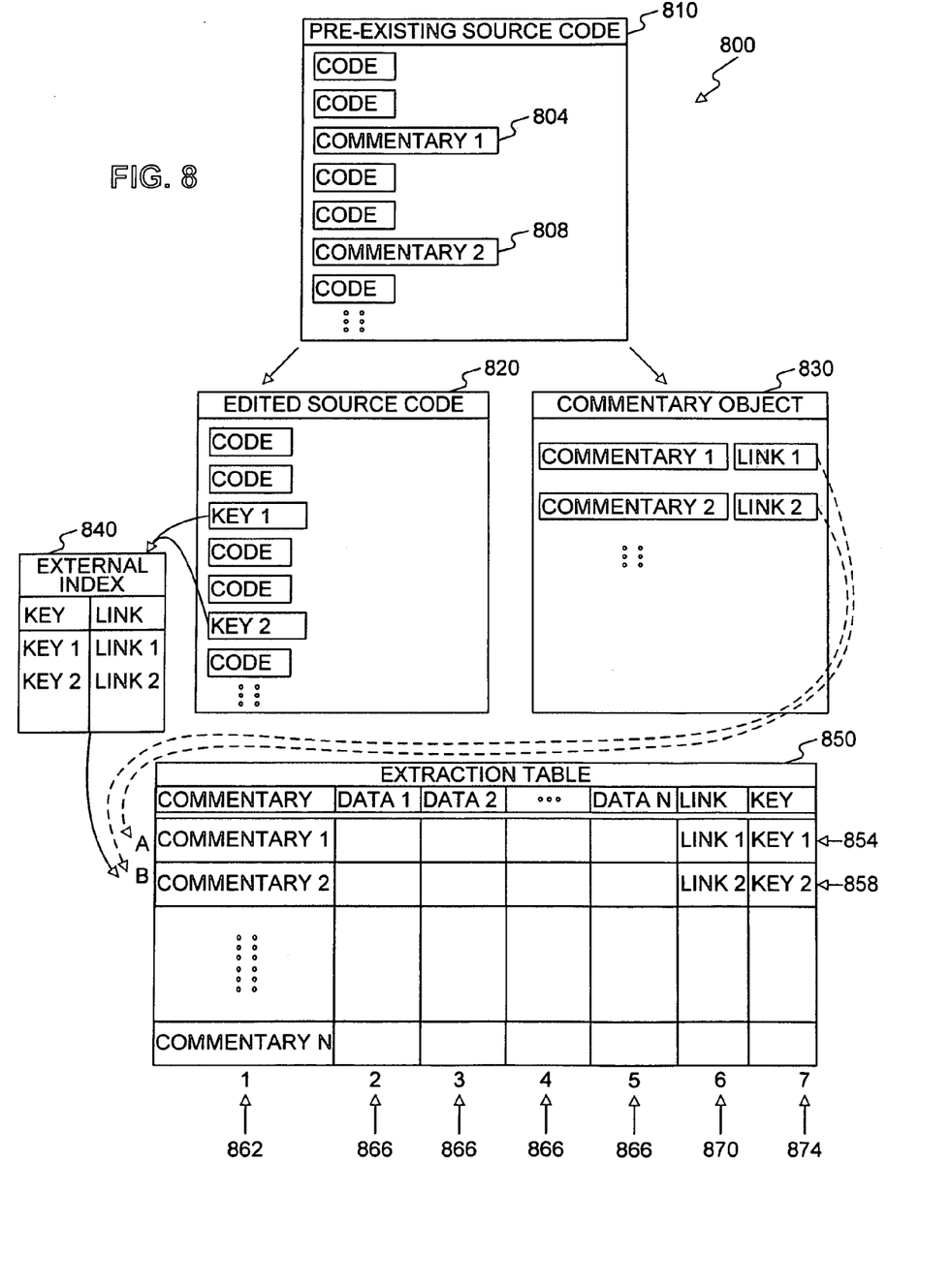
FIG. 8 is block diagram illustrating exemplary extraction table functionality consistent with certain aspects related to the present invention.

FIG. 8 is a block diagram illustrating exemplary extraction table aspects consistent with certain aspects related to the present invention. As shown in FIG. 8, pre-existing source code 810 includes first commentary portion 804 and second commentary portion 808 divided into an edited source code component 820 and a commentary object component 830. Edited source code component 820 is shown in FIG. 8 is a "marked" version of cleansed source code, as described in connection with FIG. 2 above. Source code component 820, as shown in FIG. 8, includes identifiers 822 marking positions in the code where commentary was previously located. In the exemplary embodiment shown, identifiers 822 ("key1" 824 and "key2" 826) are keys that reference the extracted commentary with the locations from where each was originally cut from the source code.

In exemplary embodiments, these keys may indirectly reference the commentary. As opposed to a link, which may be a direct reference, the keys may indirectly reference the commentary via an extraction table. Indirect referencing, such as by use of an extraction table 850 or other external index 840 to cross-reference the commentary, may be preferable when the commentary is not intended to be viewed by all users of the edited source code. Identifiers 822 (e.g., keys 824, 826 and links 832, 834) may be used to reference data stored, for example, in the extraction table 850. For instance, as shown in FIG. 8, an extraction table may comprise one or more rows of data 854, 858 including commentary fields 862, one or more data fields 866, and identifier fields such as link fields 870 and key fields 874. Data fields 866 may include any data associated with the commentary or a cleansing process as set forth above.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A computer-implemented method for editing pre-existing source code having functional code and non-functional commentary, the method comprising:
separating, by a computer, the pre-existing source code into blocks of code by performing a lexical analysis;
designating, by the computer, at least one block of code among the blocks of code using tokens or other markers;
automatically identifying, by the computer, the non-functional commentary in the pre-existing source code by performing a semantic analysis on the designated at least one block of code;
cutting, by the computer, the non-functional commentary from the pre-existing source code;
pasting the cut non-functional commentary into a commentary object; and
generating, by the computer, an edited version of the source code comprising the functional code.

2. The method of claim 1, further comprising generating reference information that associates the cut non-functional commentary with a pre-existing code location from where the non-functional commentary was cut.

3. The method of claim 2, further comprising placing the non-functional commentary in an extraction table used for associating the cut non-functional commentary with the pre-existing source code.

4. The method of claim 1, further comprising generating reference information that associates the removed non-functional commentary with a pre-existing code location from where the commentary was removed.

5. The method of claim 4, further comprising placing the non-functional commentary in an extraction table used for associating the removed non-functional commentary with the pre-existing source code.

6. The method of claim 4, wherein the reference information is included in the non-functional commentary stored in the commentary object.

7. The method of claim 4, wherein the reference information is embedded in the edited version of the source code.

8. The method of claim 1, further comprising analyzing the pre-existing source code to identify the non-functional commentary including at least partially compiling or executing the source code.

9. The method of claim 8, wherein the non-functional commentary is identified on the basis of functionality.

10. The method of claim 1, further comprising analyzing the pre-existing source code to identify the non-functional commentary including searching for the tokens or other markers.

11. A computer-implemented method for editing pre-existing source code having functional code and non-functional commentary, the method comprising:
    separating, by a computer, the pre-existing source code into blocks of code by performing a lexical analysis;
    designating, by the computer, at least one block of code among the blocks of code using tokens or other markers;
    automatically identifying, by the computer, the non-functional commentary by performing a semantic analysis on the designated at least one block code;
    cutting, by the computer, the non-functional commentary from the pre-existing source code, thereby generating an edited version of the source code comprising the functional code;
    pasting, by the computer, the cut non-functional commentary in a commentary object; and
    generating, by the computer, reference information that associates the stored non-functional commentary with a location of the pre-existing source code from where the non-functional commentary was cut.

12. A system for editing pre-existing source code comprised of functional code and non-functional commentary, the system comprising a processor that executes:
    an identification component configured to:
        separate the pre-existing source code into blocks of code by performing a lexical analysis;
        designate at least one block of code among the blocks of code using tokens or other markers; and
        automatically identify the non-functional commentary in the pre-existing source code by performing a semantic analysis on the designated at least one block of code;
    an editing component configured to:
        cut the non-functional commentary from the pre-existing source code; and
        paste the cut non-functional commentary into a commentary object;
    an edited source code providing component configured to generate an edited version of source code comprising the functional code.

13. The system of claim 12, further comprising a reference generating component configured to generate reference information that associates the cut non-functional commentary with a pre-existing source code location from where the non-functional commentary was cut.

14. The system of claim 12, further comprising a reference generating component configured to generate reference information that associates the removed non-functional commentary with a pre-existing source code location from where the non-functional commentary was removed.

15. A non-transitory computer readable medium containing executable program instructions for editing pre-existing source code comprised of functional code and non-functional commentary, the executable program instructions comprising instructions for:
    separating the pre-existing source code into blocks of code by performing a lexical analysis;
    designating at least one block of code among the blocks of code using tokens or other markers;
    automatically identifying the non-functional commentary in the pre-existing source code by performing a semantic analysis on the designated at least one block of code;
    cutting the non-functional commentary from the pre-existing source code;
    pasting the cut non-functional commentary into a commentary object; and
    generating an edited version of the source code comprising the functional code.

16. The computer readable medium of claim 15, wherein the executable program instructions further comprise instructions for generating reference information that associates the cut non-functional commentary with a pre-existing code location from where the non-functional commentary was cut.

17. The computer readable medium of claim 15, wherein the executable program instructions further comprise instructions for generating reference information that associates the removed non-functional commentary with a pre-existing code location from where the non-functional commentary was removed.

* * * * *